United States Patent [19]

Ando et al.

[11] Patent Number: 4,864,892
[45] Date of Patent: Sep. 12, 1989

[54] AUTOMATIC TRANSMISSION MECHANISM

[75] Inventors: Masahiko Ando, Okazaki; Youichi Hayakawa, Toyoaki; Masaaki Nishida; Toshihiro Yamada, both of Anjo, all of Japan

[73] Assignee: Aisin Aw Co., Ltd., Anjo, Japan

[21] Appl. No.: 179,715

[22] Filed: Apr. 11, 1988

[30] Foreign Application Priority Data

Apr. 16, 1987 [JP] Japan .................................. 62-94868

[51] Int. Cl.$^4$ ............................................ F16H 57/10
[52] U.S. Cl. ................................... 74/760; 74/766
[58] Field of Search ................................ 74/760, 766

[56] References Cited

U.S. PATENT DOCUMENTS

| | | | |
|---|---|---|---|
| 4,228,697 | 10/1980 | Miller | 74/760 X |
| 4,413,535 | 11/1983 | Hobbs | 74/760 X |
| 4,592,250 | 6/1986 | Plasencia et al. | 74/760 X |
| 4,660,439 | 4/1987 | Hiraiwa | 74/766 X |

FOREIGN PATENT DOCUMENTS 59-183147  10/1984  Japan .

Primary Examiner—Dirk Wright
Attorney, Agent, or Firm—Kanesaka and Takeuchi

[57] ABSTRACT

In an automatic transmission mechanism for an automatic transmission mounted on automobiles having two planetary gears, a one-way clutch functioning in shifting up and down between third and fourth speed is laid, and a fourth clutch is laid between the one-way clutch and an input member, and a hydraulic actuator to operate both a third clutch and a fourth clutch is laid, whereby the one-way clutch functioning in shifting up and down between third and fourth speed, plural clutches laid in the automatic transmission mechanism, the third clutch, the fourth clutch and the actuators for these clutches are in all laid in end portion of the automatic transmission mechanism.

7 Claims, 3 Drawing Sheets

|   | $C_0$ | $C_1$ | $C_2$ | $C_3$ | $B_1$ | $B_2$ | $B_3$ | $F_0$ | $F_1$ | $F_2$ |
|---|---|---|---|---|---|---|---|---|---|---|
| 1ST |  | ○ |  |  |  |  | △ |  |  | ○ |
| 2ND |  | ○ |  |  | △ | ○ |  |  | ○ |  |
| 3RD | ○ | ○ |  | ○ |  |  |  | ○ |  |  |
| 4TH | ○ |  |  | ○ | ○ |  |  |  |  |  |
| REV. |  |  | ○ |  |  |  | ○ |  |  |  |

AUTOMATIC TRANSMISSION MECHANISM

BACKGROUND OF THE INVENTION

1. FIELD OF THE INVENTION

The present invention relates to an automatic transmission mechanism which comprises two planetary gears, and is used with torque converter, in particular, relates to a structure of automatic transmission which functions as a one-way clutch in shifting up and down between third and fourth speed.

2. DESCRIPTION OF THE PRIOR ART

An automatic transmission, in general, comprises a gear unit having two single planetary gear, which is so called Simpson type.

In the above automatic transmission (Simpson type), sun gears are provided in common for both gears, and a carrier of the first planetary gear and a ring gear of the second planetary gear are linked. The driving torque is input to the ring gear and/or the sun gear of the first planetary gear selectively, and certain rotating elements in the planetary gears are restrained by brakes and one way clutches; an output is taken from the ring gear of the second planetary gear which is linked with the carrier of the first planetary gear, then the forward three speeds are obtained.

On the other hand, a four speed automatic transmission comprises three speed automatic transmission mechanism which has the above gear unit having two planetary gears and additional over-drive mechanism or under-drive mechanism comprising one planetary gear so that it can obtain forward four speeds.

However as automobiles have been required to comply with F.F. (front engine and front drive) tendency, a high horse power automatic transmission has been required, wherein minimizing in size and improvement of transmission torque capacity are further required. Under such circumstances the above mentioned four speeds automatic transmission having additional over-/under drive mechanism can not satisfy above requirements.

Then, the automatic transmission adding two clutches in the conventional mechanism is proposed to obtain forward four speeds as shown in Japanese patent No. 59-183147. A third clutch is placed between sun gears of the first and second planetary gears and the sun gear of first planetary gear and the carrier of second planetary gear are linked through a fourth clutch. The first and second planetary gears are separated by disconnecting the third clutch, driving torque is input to the carrier of second planetary gear by connecting third clutch, and an output(over drive) is taken from the ring gear by restraining the sun gear of the second planetary gear.

But it is difficult for the above modified Simpson type to embody two planetary gears because they are separated by the clutches and it is difficult to install a few clutches in one place. Accordingly to modify a three speed automatic transmission to that of four speeds requires large modification, so that automatic transmissions have to be manufactured respectively; parts, components, and assembly lines are not designed in common. Due to the above reasons, in the case of small lots and many types, very large cost increase has to be beared, and this can not comply with the recent requirements of variety of car types and their wide variations.

SUMMARY OF THE INVENTION

It is an object of this invention: a clutch section is located where easy access is possible for changing and modification of parts, speeds are easily changed by adding third clutch, etc., smooth shifting is given by utilizing a one-way clutch in third and fourth speed, mechanical locking in reverse running is prevented by a friction clutch laid between the one-way clutch and the input member, and expansion in axial direction of the automatic transmission mechanism can be limited because operation of the friction clutch is performed by utilizing a hydraulic actuator which functions in third and fourth speed.

The present invention is proposed under the above reasons.

An automatic transmission which has a gear unit having plural planetary gears, plural clutches which connect or disconnect certain rotating elements of the plural planetary gears and an input member, and a third clutch which connects the input member and a certain rotating element in third and fourth speed, comprises a one-way clutch functioning in shifting up and down between third and a fourth speed, fourth clutch located between the one-way clutch and the input member, a hydraulic actuator to operate both the third and fourth clutch, whereby the one-way clutch functioning in shifting up and down between third and fourth speed, the plural clutches, the third clutch, the fourth clutch, and the actuator for these clutches are in an all laid in end portion of the automatic transmission mechanism.

DETAILED DESCRIPTION OF THE PREFERRED EMBODIMENT

Figures 2, 3:
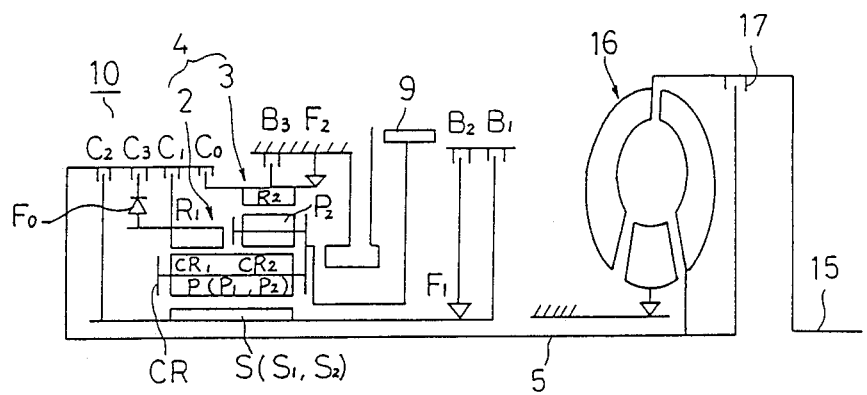
FIG. 2 is a schematic drawing of the automatic transmission mechanism (10)
FIG. 3 is an operation table.

The outline of the automatic transmission mechanism related to the present invention is explained along with FIG. 2.

An automatic transmission mechanism 10 has a gear unit 4 having a single planetary gear 2 and dual planetary gear 3, and carriers CR (CR1, CR2) and sun gears S (S1, S2) of both gears 2, 3 are coupled as one body.

The input member 5 which is laid from an engine output shaft 15, through a torque converter 16 or a lock-up clutch 17 connects a ring gear R1 of single planetary gear 2 through first clutch C1, and the input member 5 connects sun gear S through second clutch C2. The sun gear S is restrained by first brake B1 directly, and restrained its rotation in one direction by second brake B2 through first one-way clutch F1. The ring gear R2 of the dual planetary gear 3 is restrained by third brake B3, and restrained its rotation in one direction by second one-way clutch F2. The carrier CR connects an output member 9.

In addition to the above, the input member 5 connects the ring gear R2 of dual planetary gear 3 through a third clutch C0. A third one-way clutch F0 is located between the input member 5 and the ring gear R1 of single planetary gear 2 so that rotation of the ring gear R1 does not lower than that of the input member 5. And a fourth clutch C3 is located between the one-way clutch F0 and the input member 5.

In accordance with the structure mentioned above, the automatic transmission mechanism 10 performes as shown in FIG. 3.

First speed (1st) of D range: first clutch C1 is connected. Then rotation of the input member (shaft) 5 is transmitted to the ring gear R1 of single planetary gear 2 through clutch C1, and rotates the sun gear S without load in reverse direction because the ring gear R2 of dual planetary gear 3 is restrained by second one-way clutch F2. Then the carrier CR which is rotating in normal direction is slowed down largely, wherein this rotation is taken from the output member (gear) 9.

Second speed (2nd) of D range; second brake B2 works in addition to first clutch C1. The sun gear S is restrained by the first one-way clutch F1 with second brake B2 being applied, accordingly the ring gears R1 rotates the ring gear R2 of dual planetary gear 3 in normal direction without load and slows down the carrier CR in normal direction. Then this rotation is taken from the output member 9 as 2nd speed.

Third speed (3rd) of D range: third clutch C0 and fourth clutch C3 are connected in addition to first clutch C1. The rotation of the input member 5 is transmitted to the ring gear R1 of single planetary gear 2 through first clutch C1, and at the same time transmitted to the ring gear R2 of dual planetary gear 3 through third clutch C0. Two planetary gears 2, 3 rotate together, and same rotation speed as the input member 5 is transmitted to the output member 9 from the carrier CR. Under this operation second brake B2 is applied till third clutch C0 is connected so that 2nd speed does not back to first speed. And when the planetary gears 2, 3 rotate together after third clutch C0 is connected, third one-way clutch F0 is synchronized based on connection of fourth clutch C3.

Fourth (4th) speed of D range: first clutch C1 is disconnected and first brake B1 functions. The rotation of the input member 5 is transmitted to the ring gear R2 of dual planetary gear 3 through third clutch C0. Under this condition as the sun gear S is restrained, the ring gear R2 rotates the ring gear R1 without load, and rotates the carrier CR with high speed, then this rotation is taken from the output member 9 as an over drive.

At the time of shifting from third to fourth speed, even if first clutch C1 is disconnected before first brake B1 is applied, time margin is secured for the operation of first brake B1, and motion timing is easily made and smooth shifting is provided by preventing shift shock caused by gear change because third one-way clutch F0 so regulates that rotation of the ring gear R1 is not slowed down than that of the input member 5. And same as the above, when shifting from fourth speed to third speed third one-way clutch F0 so regulates that the ring gear R1, after releasing first brake B1, is not slowed down than the input member 5. Accordingly time margin is secured for the connection of first clutch C1, motion timing is easily made and smooth shifting is provided by preventing shift shock developed during gear change.

Reverse range (REV): second clutch C2 and third brake B3 (1st. Rev.) functions. The rotation of the input member 5 is transmitted to the sun gear S through second clutch C2. Under this condition the sun gear S rotates both the ring gear R1 of single planetary gear 2 and the carrier CR in reverse. This reverse rotation is taken from the output member 9.

Furthermore, even if a shift lever is moved to D range while an automobile is coasting in reverse, no mechanical locking develops because third one-way clutch F0 functions for the ring gear R1.

And in FIG. 3, Δ means that brake functions in coasting (reversal of input and output), wherein in D range the ring gear R2 and the sun gear S rotate without load because transmission is disconnected by first and second one-way clutches F1, F2, however in 1 range as the ring gear R2 is restrained by third brake B3, engine brake works under 1st speed condition, and in 2 range as the sun gear S is restrained by first brake B1, engine brake functions under 2nd speed condition.

Explanation on the embodiment related to the present invention will follow.

Figure 1:
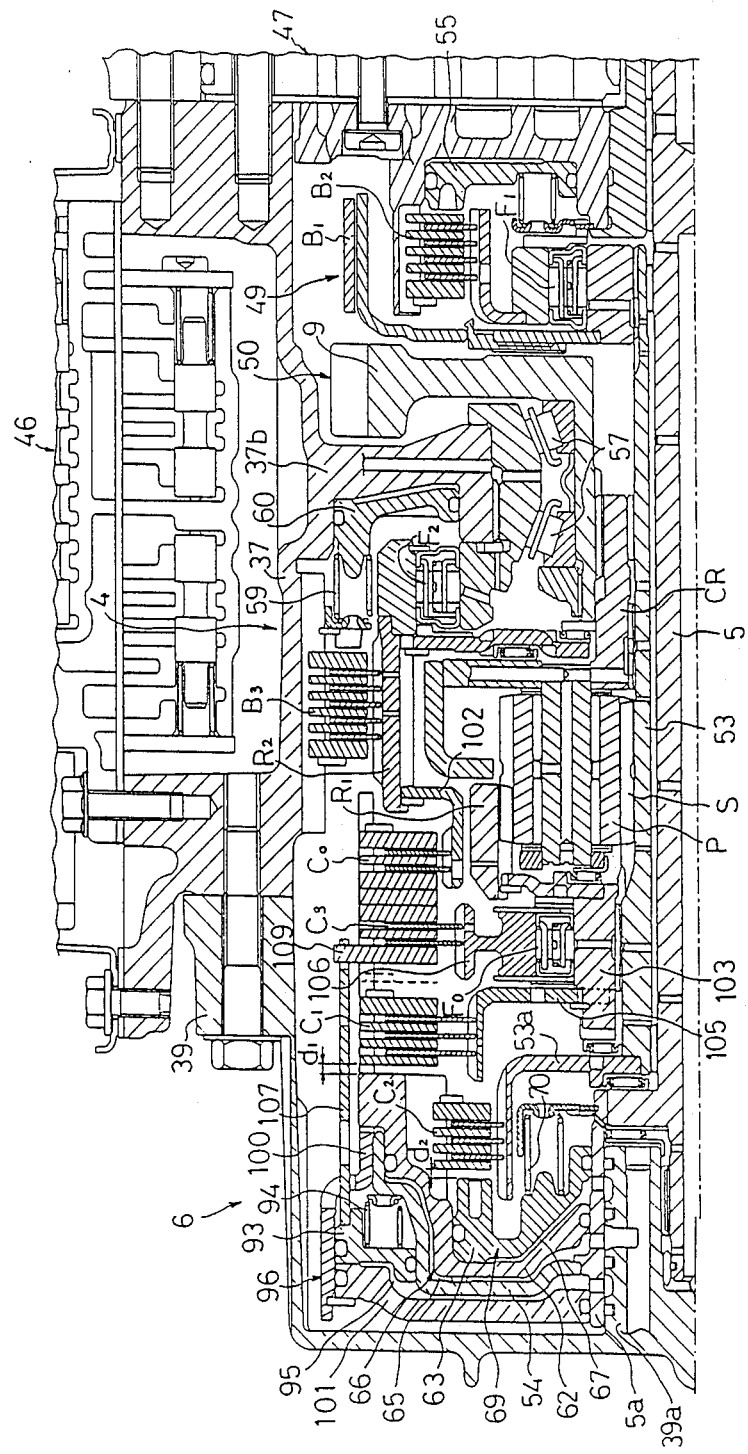
FIG. 1 a cross sectional view showing an upper half of the automatic transmission mechanism (10) related to the present invention.

A four speed automatic transmission mechanism 10, as shown in FIG. 1, is contained in a transaxle case 37 and transaxle cover 39. A valve body 46 is placed on the transaxle case 37, and an oil pump 47 is placed between the automatic transmission mechanism 10 and a torque converter 16 (refer to FIG. 2). The automatic transmission mechanism 10 comprises, toward outside from engine output portion, a brake section 49, an output section 50, a planetary gear 4 and a clutch section 6, and a hollow shaft 53 enclosing an input shaft 5 is supported to rotate freely.

The planetary gear unit 4 comprises a single planetary gear 2 and a dual planetary gear 3 (refer to FIG. 2); the single planetary gear 2 comprises a sun gear S1 which is made on the hollow shaft 53, a ring gear R1, a carrier CR1 which supports a first pinion P1 meshing with both the sun gear S1 and the ring gear R1; the dual planetary gear 3 comprises a sun gear S2 made on the hollow shaft 53, a ring gear R2, and a carrier CR2 which supports both first pinion P1 and second pinion P2 where first pinion P1 meshes with the sun gear S2, and second pinion P2 meshes with the ring gear R2. In these planetary gears 2 and 3, the sun gears S1 and S2 are made on the hollow shaft 53 and have same number of teeth (herein after described as S), the carriers CR1 and CR2 are made as one body (herein after described as CR), and the pinion P1 and P 2 are also made as one body.

The brake section 49 comprises, toward outside from inside, first one-way clutch F1, second brake B2 (disc type) and first brake B1 (band type), and a hydraulic actuator 55 made on a case of the oil pump 47 is placed next to second brake B2.

The output section 50 is located in the center of the mechanism 10, and comprises an output member 9 having an output gear. The output member 9 is supported by a separator 37b which is made as a rigid part of the axle case 37, the separator 37b supporting the output member 9 through a bearing 57 to rotate freely and to prevent axial movement, and the bearing 57 which is a double tapered roller bearing has an outer race which is fixed by spline and also has two inner races having spacer rings. The outer race has a square cut and extends toward axially, an extended section fixes an inner race of second one-way clutch F2, an outer race of second one-way clutch F2 is connected to the ring gear R2 of the dual planetary gear 3, and second one-way clutch F2 itself is laid between these outer and inner races. Consequently second one-way clutch F2, the dual planetary gear 3 and the separator 37b are positioned side by side in axial direction, and the one-way clutch F2 is laid inside the ring gear R2. Between outer surface of the ring gear R2 and the axle case 37, third brake B3 is laid, one side of the separator 37b has a cylinder, the cylinder comprises a hydraulic actuator 60 having a piston, and the cylinder is laid between second one-way F2 and the separator 37b.

The actuator 60 has an arm which is shaped like a comb, the arm extends toward axial direction over the one-way clutch F2 to control third brake B3, and on the comb shape portion a return spring 59 is installed.

The clutch section 6 comprises first clutch (forward) C1, second (direct) clutch C2, third clutch C0, fourth clutch C3, and third one-way clutch F0; the section 6 is located in an end of the mechanism 10 and contained in a transaxle cover portion 39. The end of the input shaft 5 has a sleeve 5a which encloses a boss 39a of the axle cover 39, and a flange 54 is fixed on the sleeve 5a. The flange 54 encloses movable part 62, and the movable part 62 also encloses a piston 63.

The movable part 62 and the inside of the flange 54 make an oil chamber 65, and an outer surface of the movable part 62 contacts a drum 100 which is fixed on the flange 54, so that only relative rotation of the part 62 is restrained.

The part 62 has a small distance "d1" to first clutch C1, and then a hydraulic actuator 66 for first clutch C1 is provided. The piston 63 and inside of the movable part 62 makes an oil chamber 67 and has a small distance "d2" to second clutch C2, so that a hydraulic actuator 69 for second clutch C2 is provided.

The hydraulic actuators 66, 69 have check valves (not shown) to release oil at certain pressure level in that the oil chamber 65, 67 are inevitably exposed to centrifugal force that hinders smooth release of oil.

A spring 70 is installed between and the piston 63 and a ring which is fixed on the sleeve 5a, the spring 70 is used for both pistons 62 and 63 of the hydraulic actuators 66 and 69. A ring part 101 which is located axially outside of the flung 54 is fixed on the sleeve 5a with oil proof, and the circumference of the part 101 contacts the drum 100 and fixed by a snap ring.

A piston 93 is placed between the drum 100 and the flange 54, and is pressed by a return spring 94. Then the drum 100, the flange 54, the ring part 101 and the piston 93 make a hydraulic actuator 96 of third clutch C0. Between both splines made on inner circumference of the movable part 62 and an outer surface of a flange 53a which is fixed on the hollow shaft 53, second clutch C2 is laid. The drum 100 extrudes toward the planetary gear unit 4, the extruded part of the drum 100 has comb-like section, and there the movable part 62, one of sets of discs comprising first clutch C1, fourth clutch C3 and third clutch C0 are installed without relative rotation. A flange 102 is fixed on the ring gear R3 of the dual planetary gear 3, and a spline made of a surface of the flange 102 supports another set of discs of third clutch C0. A cylindrical part 103 is supported by the hollow shaft 53 with rotation free and connects the ring gear R1 of the single planetary gear 2, and the cylindrical part 103 comprises an inner race of third one-way clutch F0 and fixes a flange 105 which supports another set of discs of first clutch C1. An outer race of third one-way clutch F0 is a part 106 which has a spline to support another set of discs of fourth clutch C3. And third one-way clutch F0 which is located between the part 106 and the cylindrical part 103 so regulates that rotation of the part 106 does not lower than that of the cylindrical part 103. The piston 93 of the hydraulic actuator 96 contacts a connecting part 107 which encloses the drum 100, and at an end of the part 107 a pressure plate 109 is connected to operate third clutch C0 and fourth clutch C3 which are placed side by side.

Actual operation of the embodiment is explained.

The torque converter 16 or the lock-up clutch 17 transmits driving torque to the input shaft 5, and the rotation of the shaft 5 is input to the mechanism 10. The automatic transmission mechanism 10 provides forward four speeds and reverse one speed in accordance with the operation of the respective clutches C1, C2, C0, C3, brakes B1, B2, B3 and one-way clutches F1, F2, F0, as shown in FIG. 3.

First speed (1st) of D range: certain oil pressure is applied to the oil chamber 65 of the actuator 66.

The movable part 62 moves against the return spring 70 so that first clutch C1 is connected. At this time the piston 63 also moves together with the part 62, but second clutch C2 is not connected because the clutch C2 moves also. Under this condition the rotation of the shaft 5 is transmitted to first clutch C1, through the flange 54 and the drum 100, and to the ring gear R1 of the single planetary gear 2.

At this time the ring gear R2 of the dual planetary gear 3 is restrained by second one-way clutch F2, so the sun gear S or the hollow shaft 53 rotates without load and the carrier CR is slowed down in rotation, and then the slowed-down rotation is taken from the output member 9.

In 1 range for reference, oil pressure is applied to the actuator 60, third brake B3 functions, the ring gear R2 is restrained, and first speed (1st) condition is kept when coasting, wherein engine brake functions.

Second speed (2nd) of D range: oil pressure is applied to the actuator 55, second brake B2 functions in addition to first clutch C1. The hollow shaft 53 or the sun gear S is restrained in certain rotating direction by first one-way clutch F1, the rotation transmitted from the input shaft 5 through first clutch C1 rotates the ring gear R2 without load and the carrier CR is slowed down, and the slowed-down rotation is taken from the output member 9.

In 2 range for reference, first brake B1 functions, the sun gear S is restrained, and second speed condition is kept when coasting, wherein engine brake functions.

Third speed (3rd) of D range: in addition to first clutch C1, oil pressure is applied to the oil chamber 95 of the actuator 96, so the piston 93 moves against the return spring 94. Then the connecting part 107 pushes the pressure plate 109, and accordingly third clutch C0 and fourth clutch C3 are connected at the same time. Under this condition the rotation of the input shaft 5 is transmitted to both the ring gear R1 through first clutch C1 and the ring gear R2 through third clutch C0. The planetary gears 2, 3 rotate together, and same rotation speed is transmitted to the output member 9 from the carrier CR. At this time second brake B2 functions till third clutch C0 is connected, so that second (2nd) speed does not back to the first (1st) speed. And when the planetary gears 2, 3 rotate together after third clutch C0 being connected, third one-way clutch F0 is synchronized in rotation by fourth clutch C3.

Fourth (4th) speed of D range: oil pressure to the actuator 66 is drained so that first clutch is released, and first brake B1 functions. Rotation of the input shaft 5 is transmitted to the ring gear of the dual planetary gear 3 through third clutch C0. Under this condition the sun gear S is restrained, the input shaft 5 rotates the ring gear R1 of the single planetary gear 2 without load and the carrier CR rotates at high speed, and the high speed rotation is taken from the output member 9 as an overdrive.

When shifting up from third to fourth speed, even if first clutch C1 is released before first brake B1, third one-way clutch F0 prevents rotation of the ring gear R1 from lowering than that of the input shaft 5 because of fourth clutch C3 being connected, so time margin is given to the function of first brake B1, function timing is made easy, and smooth shifting is obtained by preventing shift shock developed during gear changes. Same as the above, when shifting down to third speed, third one way clutch F0 prevents rotation of the ring gear R1 from lowering than that of the input shaft 5 by release of first brake B1, then time margin is given to the function of first clutch C1, function timing is made easy, and smooth shifting is obtained by preventing shift shock developed during gear changes.

Reverse range: oil pressure is applied to the oil chamber 67 of the actuator 69, and then the piston 63 is moved against the return spring 70, so that second clutch is connected. Oil pressure is also applied to the actuator 60 so that third brake B3 functions. The rotation of the input shaft 5 is transmitted to th second clutch C2 through the flange 54 and the drum 100, and transmitted to the sun gear S through the hollow shaft 53. Under this condition as the ring gear R2 of the dual planetary gear 3 is restrained, the rotation is transmitted to the carrier CR as reverse rotation, and then the reverse rotation is taken from the Under the condition that an automobile is coasting reverse, even if first clutch C1 is connected to shift to forward ranges the planetary gears 2, 3 are not mechanically locked because the su gear S is allowed in reverse rotation by first one-way clutch F1.

Figure 4:
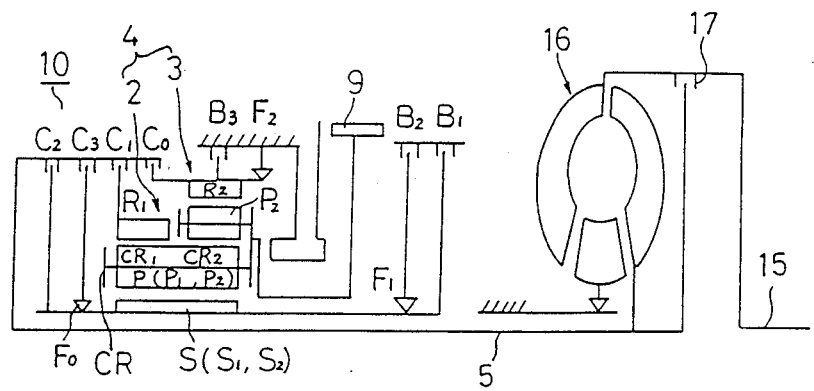
FIG. 4 is a schematic drawing of the modified automatic transmission mechanism (10).

Explanation is given to another embodiment along with FIG. 4.

The previous embodiment shows that third one-way clutch F0 is connected to the ring gear R1 of the single planetary gear 2. On the other hand, in this embodiment third one-way clutch F0 is connected to the sun gear S. In the case that fourth clutch C3 is connected, third one-way clutch F0 so regulates that rotation of the sun gear S does not exceed that of the input shaft 5.

Other items are as same as the previous embodiment, and the mechanism 10 operates as shown in FIG. 3.

Accordingly when shifting from third to fourth speed, first clutch C1 is released before first brake B1 functions. Third one-way clutch F0, based on connection of fourth clutch C3, prevents rotation of the sun gear S from getting higher than that of the input shaft 5, then time margin is given to the operation of first brake B1, function timing is made easy, and smooth shifting is obtained without shift shock developed during gear changes.

When shifting from fourth to third speed, third one-way clutch F0 prevents rotation of the sun gear S from getting higher than that of the input shaft 5 due to release of first brake B1, then time margin is given to the operation of first clutch C1, function timing is made easy, and smooth shifting is obtained without shift shock developed during gear changes.

And when coasting in reverse, even if first clutch C1 is connected to shift to D range (or 1, 2, and 3 range), as fourth clutch C3 is released, third one-way clutch F0 does not work. Consequently the planetary gears 2, 3 are not mechanically locked.

As explained, from the present invention the following advantages are obtained:

Three speed automatic transmission mechanism 10 can be easily changed to four speed automatic transmission 10 by slight modification, this means that plural types of automatic transmission can be assembled by common parts and assembly lines, and consequently expansion of facilities and cost increase are no long necessary, and this can comply with variety of car type and their wide variation because third one-way clutch F0, plural rotating elements R1, S, plural clutches C1, C2, third clutch C0, fourth clutch C3, and the hydraulic actuators 66, 69, 96 are in all laid in an end portion of the automatic transmission mechanism 10 where easy access is possible. The one-way clutch F0 makes motion timing in shifting up and down between third and fourth speed easy, and smooth shifting is obtained. In addition no valves are necessary for such motion timing, hydraulic circuit becomes simple, and furthermore, even if a shift lever is moved to forward range when an automobile is running reverse, the gear unit 4 is not mechanically locked and sudden shift shock is prevented because fourth clutch C3 is laid between the input shaft 5 and third one-way clutch F0. As fourth clutch C3 is operated by the hydraulic actuator 96 which is for third clutch C3, exclusive actuator only for fourth clutch C3 is not necessary, so quantity of parts can be decreased, weight gain can be prevented, and space constraint can be eased because the axial length of the mechanism 10 can be limited.

And, if hydraulic actuators 66, 69 for first and second clutches are laid inside an area made by the flange 54 and the drum 100 which are connecting parts of clutches C1, C2, C3, and C0, and the hydraulic actuator 96 of third clutch C0 is laid outside the area, structure of the mechanism 10 becomes simple. In particular the structure can be shortened in axial length of the mechanism 10, so it can solve space problems developing with so called front-engine-front-drive cars which requires minimum space for an automatic transmission, and the structure also provides easy assembly and disassembly, consequently assembly work can be performed easily and maintainability is enhanced.

If the automatic transmission mechanism 10 comprises the single planetary gear 2 and the dual planetary gear unit 3 in which the carriers CR and the sun gears S are coupled as one body, the ring gear R1 of the single planetary gear 2 is linked with the input shaft 5 through first clutch C1, and the sun gear S is linked with the input shaft 5 through second clutch C2, the carrier CR is linked with the output member 9, the ring gear R2 of the dual planetary gear 3 is linked with the input shaft 5 through third clutch C0, and the sun gear S and the ring gear R2 are restrained by the restraining means B1, B2, B3, F1, F2; driving torque can be input from the ring gears R1, R2 except reverse condition, so tangential force works on the tooth surface of the gears is reduced, capacity of the the restraining means is enhanced without thickening width of gear tooth, allowable input torque is also increased, furthermore connection among the respective clutches C1, C2 and C3 becomes rational, then the automatic transmission mechanism 10 becomes more compact.

What is claimed is:

1. An automatic transmission mechanism comprising:
 a gear unit having a single planetary gear and a dual planetary gear with first, second, third and fourth rotating elements, restraining means for restraining one of the first and third rotating elements, an output member connected to the second rotating element of the gear unit, an input member adapted to be connected to an output shaft of an engine, a first clutch situated between the input member and the fourth rotating element to transfer rotational power to the fourth rotating element as required, a second clutch situated between the input member and the first rotating element to transfer rotational power to the first rotating element as required, a third clutch situated between the input member and the third rotating element and operating at least at an overdriving condition, a one-way clutch connected to one of the first and fourth rotating elements and operating in shifting between a direct driving condition and the overdriving condition to regulate rotational number of one of the first and fourth rotating elements relative to the input member, a fourth clutch situated between said one-way clutch and the input member to transfer rotational power to the one-way clutch as required, and one hydraulic actuator to operate both said third and fourth clutches.

2. An automatic transmission mechanism according to claim 1, wherein said first and second clutches have plural hydraulic actuators, said one-way clutch, said first and second clutches with the hydraulic actuators, said third and fourth clutches with the hydraulic actuator being situated in an end portion of the automatic transmission mechanism.

3. An automatic transmission according to claim 2, wherein said input member is provided with a member fixed thereof, said plural hydraulic actuators for operating said first and second clutches being situated at an axially inner side of the member, and the hydraulic actuator for operating the third and fourth clutches being situated at an axially outer side of the member.

4. An automatic transmission according to claim 1, further comprising a first one-way clutch connected to the first rotating element, and a second one-way clutch connected to the third rotating element.

5. An automatic transmission according to claim 4, wherein said first rotating element is a sun gear of the gear unit, said second rotating element is a carrier of the gear unit, said third rotating element is a ring gear of the dual planetary gear, and said fourth rotating element is a ring gear of the single planetary gear; said restraining means comprises a first brake for restraining the sun gear directly, a second brake connected to the first one-way clutch for restraining the sun gear through the first one-way clutch, and a third brake connected to the third rotating element for restraining the same.

6. An automatic transmission according to claim 5, wherein said one-way clutch operating in shifting between the direct driving condition and the overdriving condition is to regulate rotation of the ring gear of the single planetary gear to prevent rotation of the ring gear lower than that of the input member when the fourth clutch is engaged.

7. An automatic transmission according to claim 5, wherein said one-way clutch operating in shifting between the direct driving condition and the overdriving condition is to regulate rotation of the sun gear to prevent rotation of the sun gear higher than that of the input member when the fourth clutch is engaged.

* * * * *

UNITED STATES PATENT AND TRADEMARK OFFICE
CERTIFICATE OF CORRECTION

PATENT NO.   : 4,864,892

DATED        : September 12, 1989

INVENTOR(S)  : Masahiko Ando et al

It is certified that error appears in the above-identified patent and that said Letters Patent is hereby corrected as shown below:

Title page, item [75] Inventors:, change "Toshihiro Yamada" to --Yoshihiro Yamada--.

Signed and Sealed this

Twenty-fourth Day of July, 1990

*Attest:*

HARRY F. MANBECK, JR.

*Attesting Officer*  *Commissioner of Patents and Trademarks*